United States Patent Office 2,857,590
Patented Oct. 21, 1958

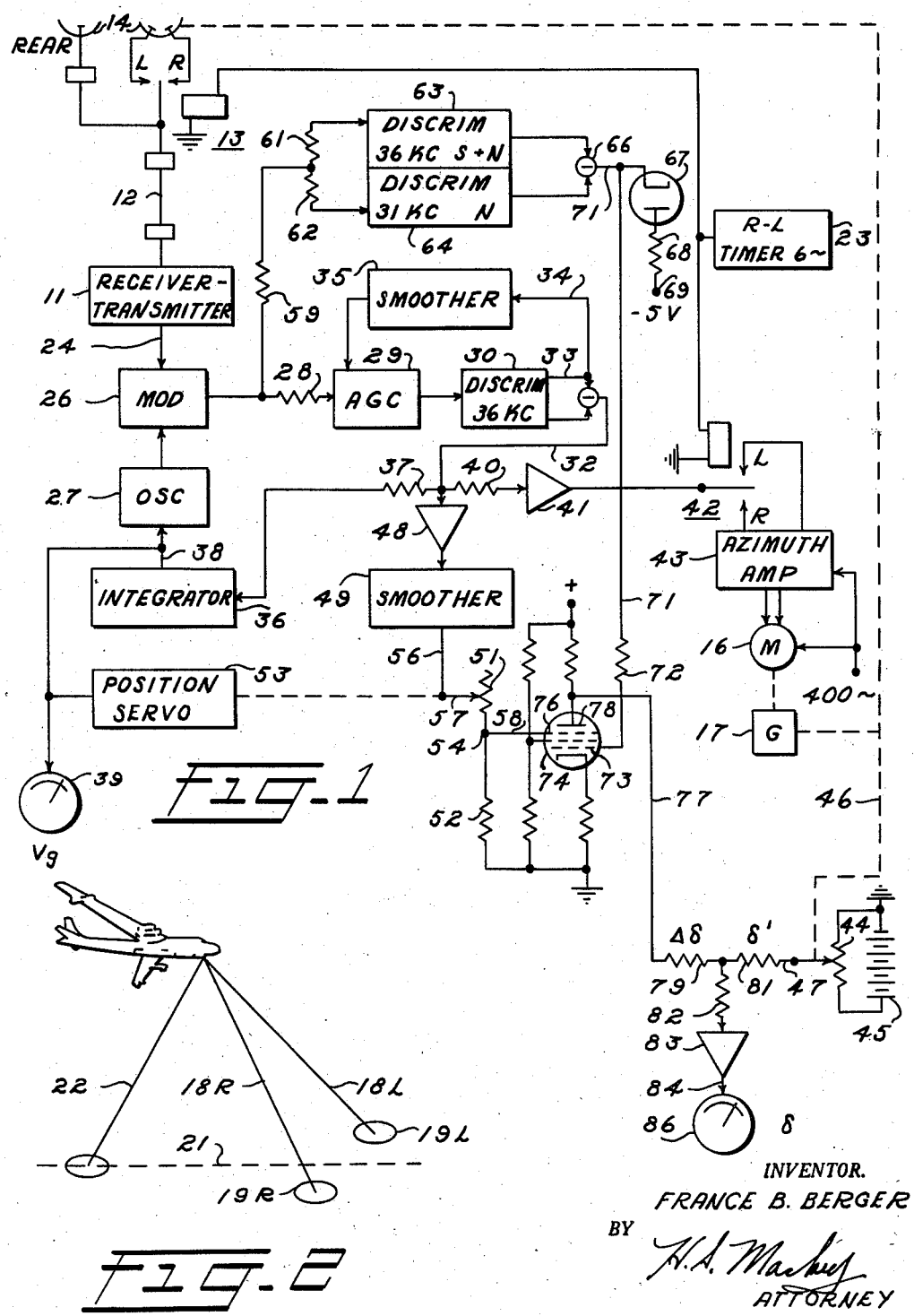

2,857,590
AIRCRAFT DRIFT ANGLE MEASURING INSTRUMENT

France B. Berger, Pleasantville, N. Y., assignor to General Precision Laboratory Incorporated, a corporation of New York Application June 22, 1956, Serial No. 593,099

10 Claims. (Cl. 343—8)

This invention relates to microwave devices carried by aircraft for measuring the drift angle thereof.

One class of such microwave devices comprises a microwave generator radiating beams of electromagnetic energy toward the earth and receiving echoes containing Doppler frequency difference information. Such apparatus employs at least two beams and measures and indicates the aircraft ground track speed ($V_g$) and the drift angle ($\delta$) between the ground track and heading directions.

In one such class of drift angle measuring instruments two beams are emitted directed forward and downward, and at equal angles in the horizontal plane, on either side of the ground track, or alternatively to the rear straddling the ground track. Use is made of the fact that if the horizontal projection of the bisector of the beams should depart from the ground track, the Doppler information frequency of one echo would increase while that of the other echo would decrease. These changes are caused to generate an error signal which, through a servomechanism, rotates the microwave beam antenna relative to the aircraft heading direction until equality is restored. The direction then assumed by the antenna is indicated in terms of drift angle. In such apparatus, however, the mass of the antenna imposes a physical limitation on the speed of its positioning by servomechanism and for this and other reasons existing apparatus indicates and transmits the drift angle with some delay. This delay, measured in seconds, is undesirable, particularly during turns, and is sometimes unacceptable.

In another class of drift angle measuring instrument the two microwave beams are not servoed, but are fixed relative to the aircraft and in general make other than equal angles with the ground track horizontal direction. It is then possible to provide an automatic computer to which are applied the two Doppler frequency difference signals, which are in general different, and from which are secured a drift angle signal. It is necessary, however, in order to secure an accurate output to measure pitch and roll angles and to insert signals representing them into the computer. This method of drift measurement is fast, because the mass of the antenna is not servoed, and the device need have only so much integration as is necessary to eliminate "radar noise" due to the nature of the signal received from the earth or sea surface. However, disadvantages of this method lie in the size, weight and complexity of the required automatic computer, and in the related fact that the functional dependence of the measured frequencies must be accurately known and instrumented in the computer.

The instant invention in one sense combines these two methods of drift angle measurement, and since it is fast and does not require much instrumentation it combines the fast speed of response of the one with the simplicity of the other. Briefly, the invention employs a servoed antenna from which a drift signal having relatively long delay is secured. Additionally an error signal is secured which represents with high accuracy the instantaneous error of the servo angle. After correction for aircraft speed and for error due to low signal-to-noise ratio (S/N), the error signal is algebraically added to the first drift signal to secure an exceedingly accurate drift signal having a delay which can be made to be a small fraction of a second.

The general purpose of this invention is to provide an improved aircraft drift angle measuring instrument.

More specifically, the purpose of this invention is to provide a light-weight drift-measuring instrument of improved instantaneous accuracy.

Further understanding of this invention may be secured from the detailed description and associated drawings, in which:

Figure 1 is a functional diagram of an embodiment of the invention, with some components schematically depicted.

Figure 2 illustrates an arrangement of microwave beams suitable for use with the invention.

Referring now to Fig. 1, a microwave receiver-transmitter 11 is mounted in an aircraft and is connected through a hollow wageguide transmission line 12 and a microwave switch 13 to a microwave antenna assembly 14. Assembly 14 emits three concentrated beams, and is servoed by an azimuth servo motor 16 through reduction gears 17 so that at the null position one of the beams is emitted toward the rear and downward, while the other two beams are emitted generally forward and downward. These three beams and the ground pattern which they make at null are illustrated in Fig. 2, with the two forward beams 18R and 18L so directed that their illuminated areas 19R and 19L are equal horizontal distances to the right and left of the ground track 21. It is obvious from this sketch that at equal angles as drawn the echo Doppler frequencies from beams 18R and 18L would be equal. But if the antenna should be rotated to move the two beams from their depicted positions, the beam moved in a direction more forwardly of the aircraft would generate an echo having increased Doppler frequency, while the echo of the other, being moved in a direction less forwardly of the aircraft would suffer reduced Doppler frequency. The three beams are not radiated simultaneously, but in the preferred design the rear beam 22 is radiated continuously, while the forward beam 18R and 18L are radiated alternately at a timer rate determined by the operation speeds of servo parts and by other considerations. It is generally found that a rate in the range of one-half to ten cycles per second is suitable. Alternation of the two beams 18R and 18L is effected by the microwave switch 13, Fig. 1, operated by a timer 23 which has a rate, for the purpose of explanation, of six cycles per second. This switch may be, for example, that described in Patent No. 2,690,539, issued September 28, 1954.

The receiver-transmitter 11 extracts from the reflected echo signals two audio signals alternating at 6 C. P. S., one of which has a frequency which equals the difference of the echo signal frequencies of beams 18R and 22, Fig. 2, and the other of which has a frequency equalling the difference of the echo signal frequencies of beams 18L and 22.

These two audio signals are transmitted through conductor 24, Fig. 1, to a modulator 26, where they are mixed with the output of an adjustable oscillator 27 to form two higher frequency signals having, for example, a mean frequency under ideal conditions of 36 kilocycles per second. These signals are applied through an isolating resistor 28 to an automatic gain control amplifier 29 and a 36 kc. s. peaked discriminator 30 emitting a difference signal at conductor 32. The direct current output at conductor 32 is a signal having an amplitude at any instant representing the departure of the signal frequency from 36 kc. s. The output imposed on conductor 33 is employed through a feedback conductor 34 and smoother 35 to control the AGC amplifier 29 in such manner that the discriminator output amplitude is solely a function of the variation of input signal Doppler frequency and is independent of aircraft speed.

Departure of the signal amplitude at conductor 32 from zero at any selected instant has one or both of two causes: first, the forward beams may not be symmetrically disposed as respects the ground track and second, the oscillator 27 may not be accurately adjusted, usually due to change in frequency of the Doppler input signal. The departure due to the latter cause is corrected by providing an integrator 36, connected to conductor 32 through decoupling resistor 37, which integrates the signal from the right and left beams to provide a direct current output signal which represents the integral of their average. This signal is applied through conductor 38 to control the frequency of oscillator 27, resulting in frequency-tracking operation of the described loop. The oscillator 27 has an output frequency linearly proportional to its bias applied from conductor 38, so that the voltage on that conductor may be employed as the analog of the input signal Doppler frequency difference of the average of beams 18R and 18L and of beam 22. Since there is a simple relation between this Doppler difference and aircraft ground speed, a voltmeter 39 is connected to conductor 38 and is calibrated to indicate ground speed, $V_g$, in knots.

In order to align the antenna assembly with the ground track the error signal in conductor 32 is applied through a resistor 40 and an amplifier 41 to a right-left switch 42. The right-left switch 42 is operated by timer 23 in both synchronism and phase with switch 13, and switches the signal alternately into one or the other of two channels of a dual azimuth amplifier 43. This amplifier applies power to a two-phase motor, tending to operate the motor in one direction when switch 42 is on one contact and in the other direction when the switch is on the other contact. Motor 16 positions antenna 14, as before mentioned. The time constant of the complete azimuth servo feedback loop, including motor 16, the antenna 14 and its mass, the receiver-transmitter 11, and frequency tracker components, is about four seconds.

In the operation of the azimuth servomechanism, when the frequency tracker loop is accurately tracking the aircraft ground speed let it be assumed that there is no tracking error signal or that its average is zero, which in the case when the antenna assembly points along the ground track. Then the Doppler difference signals of the right and left beams will be alike and will result in equal signal frequencies being applied to the discriminator. This in turn will result in equal amplitude R and L signals being applied to motor 16, so that it will operate, or tend to operate with equal torque in the forward and back rotational directions. However, should the antenna assembly depart from the ground track direction the returns of the right and left beams will no longer be equal in frequency, resulting in forward and reverse driving signals applied to motor 16 of different energies and causing a net rotation of the motor in one direction. This direction will be such as to rotate the antenna assembly toward the ground track. The operation of the azimuth servomechanism thus servoes the antenna assembly to ground track alignment and maintains it in that position.

If an angle indicator be applied to the antenna assembly, obviously the angular deflection of it from the aircraft forward axis will represent drift angle. Such an angle indicator is constituted by potentiometer 44 and battery 45 driven by motor 16 through shaft 46 and gear 17, and its direct-current output potential at conductor 47 constitutes a signal representing drift angle but embracing the four-second time delay of the azimuth servomechanism feedback loop. This angle may be termed $\delta'$.

In order to produce a highly accurate drift signal having a short time constant this rough drift signal $\delta'$ is employed together with a correction signal which is generated as follows. The discriminator output signal on conductor 32, which follows the Doppler input signal with great accuracy and rapidity, is applied to an amplifier 48. The output of the amplifier 48 is integrated or smoothed in smoothing circuit 49 having a time constant of, for example, one-half second. The rapid fluctuations characteristic of radar beam returns are thereby largely eliminated without introducing enough time delay to defeat the object of this invention. The smoothed output is next divided by a signal representing aircraft ground speed. This is necessary, when the automatic gain control amplifier 29 is employed in the described location, to give a discriminator output representative of frequency divergence, $\Delta f$, since $$\Delta f \approx \Delta \alpha V_g \qquad (1)$$

in which $\Delta f$ is frequency difference between the right and left beam returns. The equation states that $\Delta f$ is proportional to the amount of tracking error $\Delta \alpha$ and also to the ground speed $V_g$, and therefore to their product. Dividing $\Delta \alpha V_g$ by $V_g$ produces the quotient $\Delta \alpha$, which is the drift angle error.

The dividing circuit consists of resistors 51 and 52 and position servomechanism 53. It is fully described in vol. 21 of the Radiation Laboratory series entitled Electronic Instruments, by Greenwood et al., on page 58. Its operation is based on Ohm's law and causes the output potential at junction 54 to be proportional to the input potential in conductor 56 divided by the output of position servomechanism 53 represented by the position of slider 57.

If desired the automatic gain control circuit 29 may be omitted or positioned following the frequency-selective component of discriminator 30, then $$\Delta f \approx \Delta \alpha \qquad (2)$$

and the error signal representing $\Delta f$ need not be divided by $V_g$. In such a case the dividing circuit is omitted and conductor 56 is connected directly to conductor 58.

Although the discriminator output in conductor 32 is independent of signal strength at high signal levels, the output falls off at low signal-to-noise ratios. Consequently it is desirable to correct the signal at conductor 58 in accordance with the value of S/N when S/N is below a selected value. The first step in effecting this correction is to derive a signal repersenting by its amplitude the amplitude of S/N. The output of modulator 26 is coupled through resistors 59, 61 and 62 to a pair of discriminators 63 and 64 tuned respectively to derive a signal representing signal plus noise and a signal representing noise amplitude only. These signals are subtracted in the subtracting circuit 66 to produce an output in the form of negative direct potential representing by its negative magnitude the magnitude of the signal, and therefore approximately the magnitude of S/N. This signal is limited by a diode 67, resistor 68 and a negative potential source 69 having a magnitude, for example, of —5 volts. The negative potential in conductor 71 is thus limited to the value of —5 volts and to more positive values. Conductor 71 is coupled through resistor 72 to the first grid 73 of a pentode discharge tube 74. This tube is of the type which can be controlled through two grids, in this case the first grid 73 and the third grid 76, the tube type 6AS6 being such a tube. Conductor 58 is connected to the third grid 76. Changes in the output conductor 77 connected to anode 78 represent the product of changes in potentials applied to grids 58 and 73, but since the potential representing S/N is negative, increase of S/N reduces the output to a maximum reduction at a bias of —5 volts, while decrease of S/N increases the output to the point where the entire circuit becomes inoperative due to loss of input signal. Thus the reduction in the potential in conductor 58 due to decrease in S/N is approximately neutralized by increase in pentode current due to the potential change of the first grid 73, so that the output in conductor 77 is substantially independent of changes in S/N and solely represents nearly instantaneous divergences of the drift angle, δ, from its true value. These divergences may be termed Δδ.

The function δ' appearing on conductor 47, algebraically added to the function Δδ, produces a sum representing the accurate drift angle δ. This summing operation is effected in a summing circuit comprising resistors 79, 81 and 82, and amplifier 83. The amplifier output in conductor 84 is indicated by indicator 86 and repersents the corrected and accurate drift angle, incorporating a delay of one-half second.

The embodiment selected to illustrate the invention employs three microwave beams. However, several other forms of operation using two, three or four beams are possible and all can be applied to the present invention. Additionally, instead of switching right and left antenna beams, their echoes may be continuously received and applied to two separate trackers.

What is claimed is:

1. An aircraft drift angle measuring instrument comprising, a transmitter on said aircraft including a radiator radiating at least two beams of energy in different directions toward the earth, said directions including components of the aircraft velocity direction, a receiver on said aircraft for receiving earth-reflected echo signals having Doppler-shifted frequencies, means producing from said received echo signals a short time delay error signal representative of the misalignment of said radiator relative to the aircraft ground track direction, a longer time delay servomechanism actuated by said error signal to align said radiator with said ground track direction, means actuated by said servomechanism for producing an angle signal representative of radiator angle relative to a datum of said aircraft, and means adding said angle signal and said error signal to produce a corrected drift angle signal.

2. An aircraft drift angle measuring instrument comprising, a microwave transmiter, an antenna means connected thereto radiating at least two beams of microwave energy in different directions, a receiver connected to said antenna means for receiving reflected echo signals the frequencies of which are Doppler shifted relative to the frequencies of the radiated beams, said means producing from said received echo signals a short time delay error signal representative of the misalignment of said antenna means relative to the aircraft ground track direction, a longer time delay servomechanism actuated by said error signal to align said antenna with said ground track direction, means actuated by said servomechanism for producing an angle signal representative of antenna angle relative to a datum of said aircraft, and means adding said angle signal and said error signl to produce a corrected drift angle signal.

3. An aircraft drift angle measuring instrument comprising, a microwave transmitter, antenna means energized thereby radiating a plurality of beams of microwave energy in different directions and receiving the reflected echo signals thereof, the frequencies of which are Doppler shifted relative to the transmitted beams, means having said received echo signals impressed thereon and producing from the relative Doppler shift thereof an error signal representative of the short time misalaignment of the antenna means relative to the aircraft ground track, servomechanism means actuated by said error signal for aligning said antenna means with said aircraft ground track, said servomechanism means incorporating a feedback loop including said antenna means having a relatively long time period, means actuated by said servomechanism producing an angle signal indicative of the angle of said antenna means relative to said aircraft heading, and means adding said angle signal and said short time error signal to produce a corrected drift angle signal.

4. An aircraft drift angle measuring instrument comprising, a microwave transmitter, antenna means energized thereby and radiating a plurality of beams of microwave energy towards the earth in different directions and receiving the reflected echo signals thereof, the frequencies of which are Doppler shifted relative to the transmitted beams, frequency tracker means having said received echo signals impressed thereon automatically adjusting itself to follow the frequency variations of said echo signals and producing from a comparison of the frequencies of the echo signals a short time variation error signal representing the incremental misalignment of said antenna means relative to the aircraft ground track, a servomechanism means energized by said short time variation error signal for aligning said antenna means with said aircraft ground track, said servomechanism means having a relatively long time constant, means actuated by said servomechanism means for producing a long time drift angle signal indicative of the angle of said antenna means relative to said aircraft heading and means adding said short time error signal to said long time drift angle signal to produce a corrected drift angle signal.

5. An aircraft drift angle measuring instrument comprising, a microwave transmitter, antenna means energized thereby radiating a plurality of beams of microwave energy in different directions and receiving the reflected echo signals thereof, the frequencies of which are Doppler shifted relative to the transmitted beams, means having said received echo signals impressed thereon and producing from the relative Doppler shift thereof a short time error signal representative of the incremental misalignment of said antenna means relative to the aircraft ground track, means actuated by said short time error signal for aligning said antenna with said aircraft ground track, said antenna-aligning means having a relatively long time constant, means actuated by said antenna-aligning means producing a drift angle signal indicative of the angle of said antenna means relative to said aircraft heading, a signal-to-noise ratio detector actuated by said received signals producing a signal-to-noise ratio signal, means multiplying said short time error signal by an inverse function of said signal-to-noise ratio signal to produce a corrected error signal, and means adding said corrected error signal to said drift angle signal to produce a corrected drift angle signal.

6. An aircraft drift angle measuring instrument comprising, a microwave transmitter, antenna means energized thereby raidating a plurality of beams of microwave energy in different directions and receiving the reflected echo signals thereof, the frequencies of which are Doppler shifted relative to the transmitted beams, frequency tracker means having said received echo signals impressed thereon, automatically adjusting itself to follow the frequency variations of said echo signals and producing from a comparison of the frequencies thereof a short time variation error signal representative of the incremental misalignment of said antenna means relative to the aircraft ground track, a servomechanism energized by said short time variation error signal for aligning said antenna means with said aircraft ground track, said servomechanism having a relatively long time constant, means actuated by said servomechanism for producing a long time constant drift angle signal indicative of the angle of said antenna means relative to the heading of said aircraft, a signal-to-noise ratio detector energized from said frequency tracker means producing a signal-to-noise ratio signal, means multiplying said short time error signal by an inverse function of said signal-to-noise ratio signal to produce a corrected error signal, and means adding said corrected error signal to said long time constant drift angle signal to produce a corrected drift angle signal, 7. An aircraft drift angle measuring instrument comprising, a microwave transmitter, antenna means, switching means interconnecting said transmitter and said antenna means to cause said antenna to alternately emit one or the other of a pair of beams of microwave energy in directions making equal angles on each side of the longitudinal center line of said antenna means, receiver means connected to said antenna means for alternately receiving echo signals produced by the reflection of said beams by the earth's surface, the frequencies of said echo signals being Doppler shifted relative to the frequencies of said emitted beams, means producing from said Doppler-shifted echo signals a pair of short time error signals the respective amplitudes of which are representative of said Doppler shifts of the frequencies of the echo signals, said Doppler shifts representing the misalignments of said two beams with the aircraft ground track direction, long-delay servomechanism means actuated alternately by the two amplitudes of said pair of short time error signals to rotate said antenna in one direction at a speed dependent upon one said amplitude and in the other direction at a speed dependent upon the other said amplitude, said one and the other speeds being such as to tend to equalize said short time error signals, means electrically indicating the drift angle between said longitudinal center line of the antenna means and the aircraft heading line, means integrating said pair of short term error signals to form an average error signal, and means adding said average error signal to said electrical angle indication to form a corrected drift angle signal.

8. An aircraft drift angle measuring instrument comprising, a microwave transmitter, antenna means energized thereby and radiating at least three beams of microwave energy toward the earth in different directions and receiving the reflected echo signals thereof having frequencies Doppler shifted relative to the transmitted beams, a microwave receiver converting said echo signals to signals having the Doppler-shift frequencies thereof, frequency tracker means having said Doppler frequency signals impressed thereon and automatically adjusting itself to follow frequency variation and producing therefrom a short time variation error signal representing the incremental misalignment of said antenna means relative to the aircraft ground track, said frequency tracker means producing a second signal representative of aircraft ground track speed, a dividing circuit dividing said error signal by said second signal to form a corrected error signal, a servomechanism means energized by said short time variation error signal for aligning said antenna means with said aircraft ground track, said servomechanism means having a relatively long time constant, means actuated by said servomechanism means for producing a long time constant drift angle signal indicative of the angle of said antenna means relative to said aircraft heading, and means adding said corrected error signal to said drift angle signal to produce a corrected drift angle signal.

9. An aircraft drift angle measuring instrument comprising, a microwave transmitter, antenna means energized thereby radiating a plurality of beams of microwave energy in different directions and receiving the reflected echo signals thereof having frequencies Doppler shifted relative to transmitted frequency, a microwave receiver converting said echo signals to signals having the Doppler-shifted frequencies thereof, frequency-tracker means having said Doppler-shift signals impressed thereon and producing therefrom a short time error signal representative fo the incremental misalignment of said antenna means with the aircraft ground track, means actuated by said short time error signal for aligning said antenna with said aircraft ground track, said antenna-aligning means having a relatively long time constant, means actuated by said antenna-aligning means producing a drift angle signal indicative of the angle of said antenna means relative to said aircraft heading, a signal-to-noise ratio detector actuated from said frequency tracker means producing a signal-to-noise ratio signal, circuit means multiplying said short time error signal by a function which equals a constant minus a multiple of said signal-to-noise ratio signal to form a corrected error signal unaffected by signal-to-noise ratio magnitude, and a summing circuit adding said corrected error signal to said drift angle signal to form a corrected drift angle signal.

10. An aircraft drift angle measuring instrument comprising, a microwave transmitter, antenna means energized thereby radiating at least three beams of microwave energy toward the earth in different directions and receiving echo signals reflected therefrom having frequencies Doppler shifted relative to the transmitter frequency, frequency tracker means having said received signals impressed thereon and automatically adjusting itself to follow frequency variations thereof, said frequency tracker means emitting a short time variation error signal representing the instrumental misalignment of said antenna means with the aircraft ground track, means actuated by said error signal and having a relatively long time variation aligning said antenna means to said aircraft ground track and emitting a drift angle signal representing the angle between said antenna means and the aircraft heading datum line, a long time integrated signal emitted by said frequency tracker receiver means representative of aircraft ground track speed, dividing circuit means dividing said error signal by said integrated ground speed signal to form a corrected error signal, a signal-to-noise ratio detector actuated from said frequency-tracker receiver means producing a signal-to-noise ratio signal, circuit means multiplying said corrected error signal by a function of said signal-to-noise ratio signal to form a second corrected signal which does not vary with signal-to-noise ratio variations, and a summing circuit receiving said second corrected signal and said drift angle signal and emitting a corrected drift angle signal which is their sum.

No references cited.